United States Patent
Chen et al.

(10) Patent No.: US 10,116,671 B1
(45) Date of Patent: *Oct. 30, 2018

(54) DISTRIBUTED DENIAL-OF-SERVICE ATTACK DETECTION BASED ON SHARED NETWORK FLOW INFORMATION

(71) Applicant: International Business Machines Corporation, Armonk, NY (US)

(72) Inventors: Kuo-Chun Chen, New Taipei (TW); Chih-Hung Chou, Taipei (TW); Wei-Hsiang Hsiung, Taipei (TW); Sheng-Tung Hsu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,092

(22) Filed: Sep. 28, 2017

(51) Int. Cl.
*H04L 29/06* (2006.01)

(52) U.S. Cl.
CPC ...... *H04L 63/1416* (2013.01); *H04L 63/1458* (2013.01)

(58) Field of Classification Search
CPC ............ G06F 9/45558; G06F 9/45537; G06F 12/1009; G06F 2009/45583; G06F 2009/45595; G06F 2212/151; H04L 12/4633; H04L 45/74; H04L 45/745; H04L 63/029; H04L 63/08; H04L 63/1433; H04L 67/1097; H04L 63/1416; H04L 63/1458
See application file for complete search history.

(56) References Cited

U.S. PATENT DOCUMENTS

| | | | |
|---|---|---|---|
| 8,397,284 B2* | 3/2013 | Kommareddy | H04L 63/1458 726/11 |
| 8,593,958 B2* | 11/2013 | Zhang | H04L 43/026 370/230.1 |
| 8,634,717 B2 | 1/2014 | Kang et al. | |
| 8,725,898 B1* | 5/2014 | Vincent | H04L 61/2061 709/238 |
| 9,167,004 B2 | 10/2015 | Pappu et al. | |
| 9,645,835 B2* | 5/2017 | Phillips | G06F 9/44505 |

(Continued)

OTHER PUBLICATIONS

Zhang, Decentralized Information Sharing for Detection and Protection Against Network Attacks, 2006, Rutgers, The State University of New Jersey, p. i-ii, 8-11, 50-72.*

(Continued)

*Primary Examiner* — Joseph P Hirl
*Assistant Examiner* — Stephen Gundry
(74) *Attorney, Agent, or Firm* — Yee & Associates, P.C.; Jeffrey LaBaw

(57) ABSTRACT

A system and computer program product for detecting distributed denial-of-service (DDoS) attacks is provided. Current aggregated flow information for a defined period of time is analyzed. It is determined whether network flow increased above a defined flow threshold value to a second data processing system connected to a network within the defined period of time based on analyzing the current aggregated flow information. In response to determining that the network flow has increased above the defined flow threshold value to the second data processing system connected to the network within the defined period of time, it is determined that the second data processing system is under a DDoS attack.

10 Claims, 5 Drawing Sheets

(56) References Cited

U.S. PATENT DOCUMENTS

| | | | |
|---|---|---|---|
| 9,697,030 B2* | 7/2017 | Koponen | G06F 9/45558 |
| 9,697,033 B2* | 7/2017 | Koponen | H04L 49/70 |
| 9,712,436 B2* | 7/2017 | Tsirkin | H04L 69/324 |
| 9,729,679 B2* | 8/2017 | Raju | H04L 69/161 |
| 9,742,726 B2* | 8/2017 | Kolesnik | H04L 61/2015 |
| 9,755,903 B2* | 9/2017 | Masurekar | H04L 41/0846 |
| 9,781,009 B2* | 10/2017 | Mehra | H04L 41/12 |
| 9,785,455 B2* | 10/2017 | Chandrashekhar | G06F 9/455 |
| 9,785,459 B2* | 10/2017 | Tsirkin | G06F 9/45558 |
| 9,792,447 B2* | 10/2017 | Thota | G06F 21/602 |
| 9,794,186 B2* | 10/2017 | Xiao | H04L 47/70 |
| 9,807,020 B2* | 10/2017 | Mekkattuparamban | H04L 47/20 |
| 9,819,581 B2* | 11/2017 | Chanda | H04L 45/586 |
| 2006/0272018 A1 | 11/2006 | Fouant | |
| 2007/0130619 A1* | 6/2007 | Reams, III | H04L 63/1425 726/13 |
| 2008/0028467 A1* | 1/2008 | Kommareddy | H04L 63/1458 726/23 |
| 2011/0072515 A1 | 3/2011 | Park et al. | |
| 2011/0138463 A1 | 6/2011 | Kim et al. | |
| 2012/0179776 A1* | 7/2012 | Umezuki | H04L 63/10 709/217 |
| 2013/0003538 A1* | 1/2013 | Greenberg | H04L 47/623 370/230 |
| 2013/0034094 A1* | 2/2013 | Cardona | H04L 49/70 370/360 |
| 2013/0061047 A1* | 3/2013 | Sridharan | H04L 45/586 713/162 |
| 2014/0156818 A1* | 6/2014 | Hunt | H04L 63/0407 709/222 |
| 2014/0189867 A1* | 7/2014 | Jung | H04L 63/1458 726/23 |
| 2014/0348161 A1* | 11/2014 | Koponen | H04L 45/64 370/389 |
| 2016/0057014 A1* | 2/2016 | Thakkar | G06F 9/45558 709/223 |
| 2016/0191545 A1* | 6/2016 | Nanda | H04L 43/062 726/1 |
| 2016/0381080 A1* | 12/2016 | Reddem | H04L 63/0884 726/1 |
| 2017/0126559 A1* | 5/2017 | Han | G06F 9/45558 |
| 2017/0195454 A1* | 7/2017 | Shieh | H04L 67/32 |
| 2017/0230241 A1* | 8/2017 | Neginhal, Sr. | H04L 41/0803 |
| 2017/0250912 A1* | 8/2017 | Chu | H04L 45/745 |
| 2017/0262300 A1* | 9/2017 | Brandwine | G06F 9/455 |
| 2017/0264622 A1* | 9/2017 | Cooper | G06F 21/606 |
| 2017/0277557 A1* | 9/2017 | Koponen | H04L 41/0823 |
| 2017/0279838 A1* | 9/2017 | Dasgupta | H04L 63/1425 |
| 2017/0295033 A1* | 10/2017 | Cherian | H04L 12/4633 |
| 2017/0300349 A1* | 10/2017 | Shaw | G06F 9/45558 |
| 2017/0302673 A1* | 10/2017 | Makhervaks | H04L 63/0236 |
| 2017/0310571 A1* | 10/2017 | Singaravelu | H04L 43/16 |
| 2017/0346732 A1* | 11/2017 | Zhang | H04L 45/745 |
| 2017/0353433 A1* | 12/2017 | Antony | H04L 63/0245 |
| 2018/0054458 A1* | 2/2018 | Marck | H04L 63/1458 |

OTHER PUBLICATIONS

Jun et al. "DDoS attack detection by using packet sampling and flow features", Proceedings of the 29th Annual ACM Symposium on Applied Computing, Mar. 2014, pp. 711-712. Abstract Only.

Nanda, "How to Detect Serious DDoS Attack", tutorialspoint.com, Jul. 1, 2016, 6 pages. http://www.tutorialspoint.com/articles/how-to-detect-serious-ddos-attack.

Sperotto et al., "An Overview of IP Flow-Based Intrusion Detection", IEEE Communications Surveys & Tutorials, vol. 12, Issue 3, Apr. 26, 2010, pp. 343-356. Abstract Only.

Zhang et al., "Cooperative detection and protection against network attacks using decentralized information sharing", Cluster Computing, vol. 13, Issue 1, Mar. 2010, pp. 67-86. Abstract Only.

* cited by examiner

DISTRIBUTED DENIAL-OF-SERVICE ATTACK DETECTION BASED ON SHARED NETWORK FLOW INFORMATION

BACKGROUND

1. Field

The disclosure relates generally to network security and more specifically to detecting distributed denial of service attacks within a network based on data processing systems connected to the network sharing network flow information with other randomly selected data processing systems.

2. Description of the Related Art

A denial-of-service attack is an attempt to make a machine or network resource unavailable or available with a very low level of service, such as an unacceptable amount of response time, by consuming its resources so that it can no longer provide its intended service. A denial-of-service attack that is sent by multiple devices is referred to as a distributed denial-of-service attack (DDoS). Typically, DDoS attacks are highly distributed and well-coordinated offensive assaults on services, host machines, and network infrastructure and may have disastrous effects, which may include financial losses and disruption of essential services. With the rapid growth of the number of Internet of Things (IOT) devices, problems associated with DDoS attacks may become more and more severe.

A DDoS attack delivers a large number of service requests within a short period of time. This large number of service requests overwhelm the service capacity of the provider. In addition, because a DDoS attack is typically highly distributed, the DDoS attack may originate from anywhere within the network. As a result, obtaining a complete real-time picture of network data flows corresponding to a DDoS attack on an ongoing basis may be difficult.

SUMMARY

According to one illustrative embodiment, a computer-implemented method for detecting distributed denial-of-service (DDoS) attacks is provided. A first data processing system analyzes current aggregated flow information for a defined period of time. The first data processing system determines whether network flow increased above a defined flow threshold value to a second data processing system connected to a network within the defined period of time based on the analyzing of the current aggregated flow information. In response to the first data processing system determining that the network flow has increased above the defined flow threshold value to the second data processing system connected to the network within the defined period of time, the first data processing system determines that the second data processing system is under a DDoS attack. According to other illustrative embodiments, a data processing system and computer program product for detecting DDoS attacks are provided.

DETAILED DESCRIPTION

Figure 1:
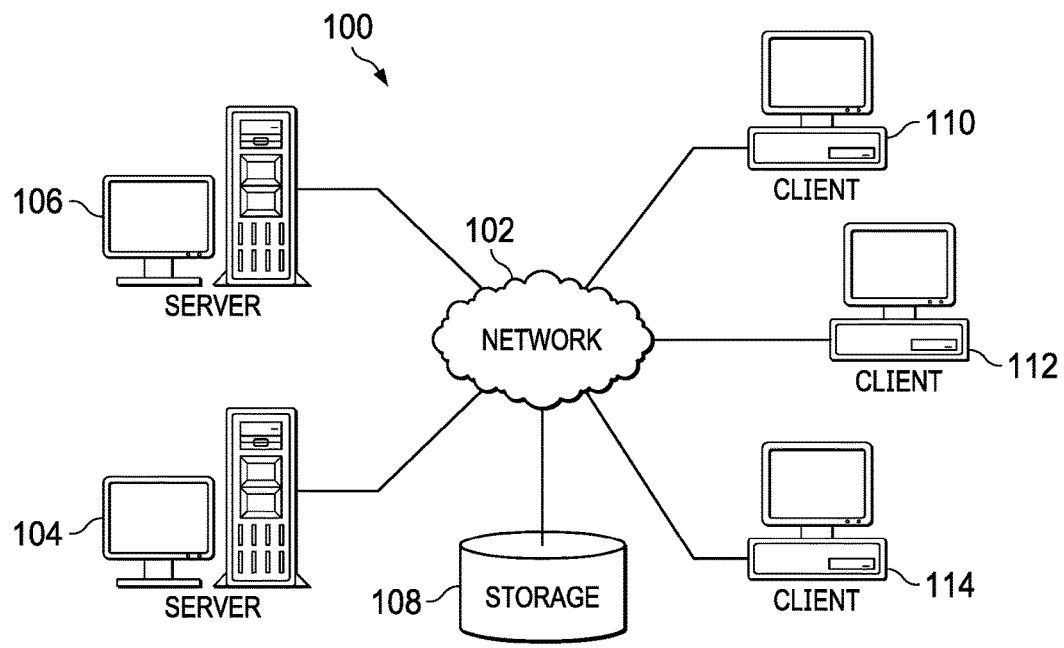
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
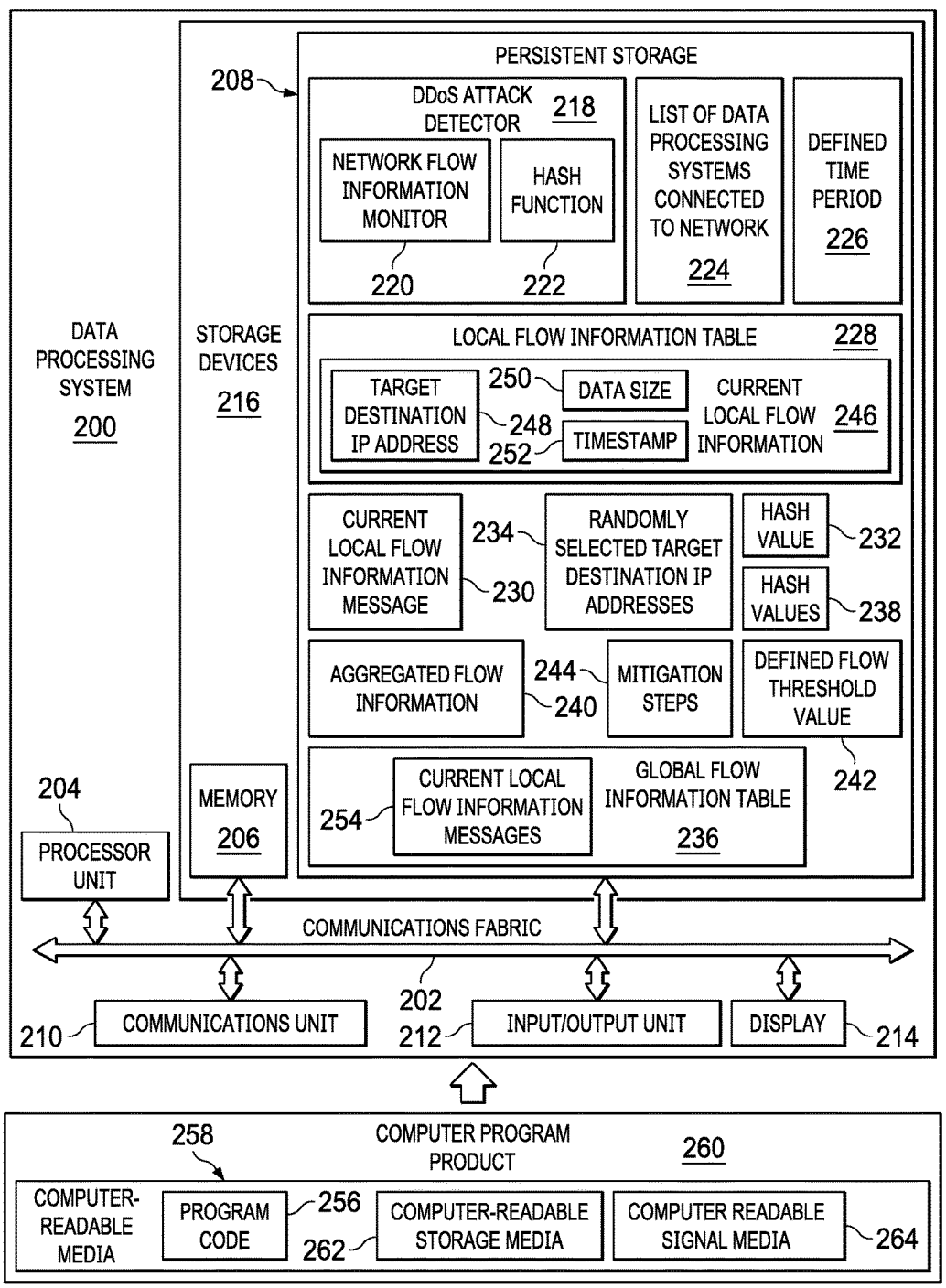
FIG. 2 is a diagram of a data processing system in which illustrative embodiments may be implemented.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide network services to client devices. The network services may be, for example, financial services, banking services, educational services, governmental services, utility services, security services, information search services, social media services, messaging services, and the like. Also, it should be noted that server 104 and server 106 may each represent a plurality of different servers providing a plurality of different network services.

Client 110, client 112, and client 114 also connect to network 102. Clients 110, 112, and 114 are clients of server 104 and server 106. Users of clients 110, 112, and 114 may utilize clients 110, 112, and 114 to request network services from server 104 or server 106. Further, server 104 and server 106 may provide information, such as, for example, software applications, programs, and the like, to clients 110, 112, and 114.

In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, smart appliances, smart thermostats, personal digital assistants, gaming devices, kiosks, and the like, with wire or wireless communication links to network 102.

Storage 108 is a network storage device capable of storing any type of data in a structured format or an unstructured format. In addition, storage 108 may represent a set of one or more network storage devices. Storage 108 may store, for example, identifiers for a plurality of different client devices; network flow information corresponding to each of the plurality of different client devices; aggregated network flow information corresponding to the plurality of client devices; defined network flow threshold values; network flow monitors, and the like. Further, storage 108 may store other data, such as authentication or credential data that may include user names, passwords, and biometric data associated with users and system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a peer-to-peer network, an ad-hoc peer-to-peer network, or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a data processing device, such as server 104 or client 110 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores distributed denial-of-service (DDoS) attack detector 218. DDoS attack detector 218 detects DDoS attacks within a network, such as network 102 in FIG. 1, using shared network flow information received from a plurality of other data processing systems connected to the network. It should be noted that even though DDoS attack detector 218 is illustrated as residing in persistent storage 208, in an alternative illustrative embodiment DDoS attack detector 218 may be a separate component of data processing system 200. For example, DDoS attack detector 218 may be a hardware component coupled to communication fabric 202 or a combination of hardware and software components.

In this example, DDoS attack detector 218 includes network flow information monitor 220 and hash function 222. However, it should be noted that DDoS attack detector 218 may include more or fewer components than illustrated. DDoS attack detector 218 utilizes network flow information monitor 220 to monitor and record local network flow information corresponding to data processing system 200. DDoS attack detector 218 utilizes hash function 222 to generate a hash value for outgoing and incoming network flow information messages. Hash function 222 may be, for example, Message Digest 5 (MD5) hashing algorithm, Secure Hash Algorithm 3 (SHA-3), or the like.

In this example, persistent storage 208 also stores list of data processing systems connected to network 224, defined time period 226, local flow information table 228, current local flow information message 230, hash value 232, randomly selected target destination internet protocol (IP) addresses 234 based on hash value 232, global flow information table 236, hash values 238, aggregated flow information 240, defined flow threshold value 242, and mitigation steps 244. List of data processing systems connected to network 224 represents a listing of each data processing system connected to the network, along with corresponding identifiers and IP addresses. Defined time period 226 represents a predetermined time interval threshold for when DDoS attack detector 218 is to transmit current local flow information corresponding to data processing system 200 to randomly selected other data processing systems connected to the network and when DDoS attack detector 218 is to aggregate current local flow information received from other data processing systems connected to the network.

Network flow information monitor 220 of DDoS attack detector 218 analyzes incoming data packets and records current local flow information 246 corresponding to data processing system 200 in local flow information table 228. Current local flow information 246 represents data corresponding to the current real-time network flow of data packets to data processing system 200 within defined time period 226. In this example, current local flow information 246 includes target destination IP address 248, data size 250, and timestamp 252. Target destination IP address 248 represents the final destination of each data packet, which may be data processing system 200, itself, or another data processing system connected to the network. Data size 250 represents an amount of data contained within each data packet. Timestamp 252 represents a time when data processing system 200 received each data packet via the network. Participating data processing systems utilize the timestamp information to determine the amount of data packets flowing to a particular data processing system within the defined period of time.

At the end of each defined time period 226, DDoS attack detector 218 generates a current local flow information message, such as current local flow information message 230. Current local flow information message 230 contains the information within local flow information table 228 for a respective defined time period 226. In addition, DDoS attack detector 218 utilizes hash function 222 to generate a hash value, such as hash value 232, for current local flow information message 230. DDoS attack detector 218 utilizes hash function 222 to randomly select a plurality of target destination IP addresses based on hash value 232, such as randomly selected target destination IP addresses 234, corresponding to a plurality of other data processing systems connected to the network to receive current local flow information message 230. DDoS attack detector 218 sends hash value 232 with current local flow information message 230 for validating current local flow information message 230 at the target destinations.

DDoS attack detector 218 utilizes global flow information table 236 to store current local flow information messages 254. Current local flow information messages 254 represent a plurality of different messages containing current flow information corresponding to a plurality of different data processing systems connected to the network for defined time period 226. Further, upon receiving current local flow information messages 254 from the plurality of different data processing systems, DDoS attack detector 218 generates a hash value for each of the plurality of received network flow messages, such as hash values 238, to validate each of the received messages. If DDoS attack detector 218 is not able to validate a received network flow information message, then DDoS attack detector 218 discards that particular network flow information message. DDoS attack detector 218 may validate incoming network flow information messages by, for example, comparing generated hash values 238 with originally generated hash values sent with the network flow messages from the other data processing systems.

Moreover, DDoS attack detector 218 aggregates data in current local flow information 246 with data in valid current local flow information messages 254 for each defined time period 226 to form aggregated flow information 240. Aggregated flow information 240 provides a real-time current snapshot of the amount of network data packets flowing to different data processing systems via the network for defined time period 226. DDoS attack detector 218 analyzes aggregated flow information 240 to detect whether data processing system 200, itself, and/or another data processing system connected to the network is under a DDoS attack. For example, based on the analysis of aggregated flow information 240, if DDoS attack detector 218 determines that the amount of network data packet flow to data processing system 200 or another data processing system from a plurality of different data processing systems exceeds defined flow threshold value 242 for defined time period 226, then DDoS attack detector 218 detects that that particular data processing system is under a DDoS attack.

If DDoS attack detector 218 detects a DDoS attack, then DDoS attack detector 218 performs mitigation steps 244. Mitigation steps 244 represent a set of affirmative action steps that DDoS attack detector 218 takes to halt the DDoS attack. For example, if DDoS attack detector 218 detects that data processing system 200, itself, is under a DDoS attack, then DDoS attack detector 218 may, for example, identify the source of the attack and drop packets coming from that source or may generate a firewall preventing packets from that source from getting to data processing system 200. DDoS attack detector 218 also may display a warning popup indicating that a DDoS attack is in progress in display 214 of data processing system 200 to inform a user of the attack. If DDoS attack detector 218 detects that another data processing system connected to the network is under a DDoS attack, then DDoS attack detector 218 may, for example, send a notification to that particular data processing system prompting that particular data processing system to take appropriate mitigation steps and informing its user of the DDoS attack.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (WiFi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 256 is located in a functional form on computer readable media 258 that is selectively removable and may be loaded onto or transferred to data processing system 200 for running by processor unit 204. Program code 256 and computer readable media 258 form computer program product 260. In one example, computer readable media 258 may be computer readable storage media 262 or computer readable signal media 264. Computer readable storage media 262 may include, for example, an optical or magnetic disc that is inserted or placed into a drive or other device that is part of persistent storage 208 for transfer onto a storage device, such as a hard drive, that is part of persistent storage 208. Computer readable storage media 262 also may take the form of a persistent storage, such as a hard drive, a thumb drive, or a flash memory that is connected to data processing system 200. In some instances, computer readable storage media 262 may not be removable from data processing system 200.

Alternatively, program code 256 may be transferred to data processing system 200 using computer readable signal media 264. Computer readable signal media 264 may be, for example, a propagated data signal containing program code 256. For example, computer readable signal media 264 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 256 may be downloaded over a network to persistent storage 208 from another device or data processing system through computer readable signal media 264 for use within data processing system 200. For instance, program code stored in a computer readable storage media in a data processing system may be downloaded over a network from the data processing system to data processing system 200. The data processing system providing program code 256 may be a server computer, a client computer, or some other device capable of storing and transmitting program code 256.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 262 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The first step in decreasing or eliminating the effects of a DDoS attack is to detect the DDoS attack as quickly as possible. Illustrative embodiments detect DDoS attacks by analyzing shared network flow information between data processing systems (e.g. how many bytes are sent to a target data processing system within a predefined period of time). Illustrative embodiments can be applied to all data processing nodes connected to a network. In other words, all network data processing nodes can participate in the network flow information sharing process of illustrative embodiments to detect DDoS attacks. Thus, illustrative embodiments provide all participating data processing nodes in the network with a sampled picture of the amount of network data packet flow. It should be noted that participating data processing nodes share their respective local flow information with other participating data processing nodes randomly. Also, it should be noted that participating data processing nodes may communicate with each other using a customized Transmission Control Protocol (TCP) or User Datagram Protocol (UDP) socket. When the number of participating data processing nodes within a network is above a threshold number of participating nodes, then the sampled network flow information provides a reliable reflection of network flow.

Illustrative embodiments utilize a hashing function that receives network flow information as input and outputs random target destination IP addresses corresponding to participating data processing nodes to share the network flow information with. This deterministic random approach prevents malicious participants within the network from providing false network flow information to undermine the DDoS detection process of illustrative embodiments. Each data processing node joining the network may learn the current network flow status from shared network flow information provided by other participating data processing nodes and take the appropriate mitigation steps once a data processing node becomes aware that abnormal data packet traffic exists (i.e., DDoS attack) within the network.

A participating data processing node may be, for example, a personal computer, a mobile phone, or any other computing device that can connect to the network, such as the Internet. A participating data processing node may act as a sending data processing node, which records and shares its local network flow information with other data processing nodes. In addition, a participating data processing node also may act as a receiving data processing node, which receives and aggregates network flow information received from other data processing nodes connected to the network.

The sending data processing node generates and sends a local network flow information message (e.g., data packet) containing the current real-time flow information corresponding to that sending data processing node for a specified interval of time. For each specified interval of time (i.e., current network flow information period), the sending data processing node generates a new local network flow information message and distributes that message to a random set of target data processing nodes. The sending data processing node generates each new message based on local network flow information corresponding to that sending data processing node and other network flow information messages received from other data processing nodes connected to the network.

The sending data processing node randomly selects the set of target data processing nodes based on a hash value of each new local network flow information message. When a receiving data processing node receives an incoming network flow information message, the receiving data processing node calculates a hash value of the message and the set of target destinations based on the hash value to determine whether the message is valid.

During an initialization phase, each data processing node generates a local network flow information table and a global network flow information table. The data processing nodes utilize the tables to store the network flow information, such as, for example, target destination IP address, data size, timestamp, and the like, which the data processing nodes utilize to detect DDoS attacks within the network.

During each defined time period, a data processing node records its local network flow information in the local network flow information table. In addition, the data processing node receives one or more network flow information messages from other data processing nodes connected to the network and records the flow information contained in the received network flow information messages in the global network flow information table. Because table space is limited, the data processing system aggregates the received flow information and only maintains a top number of entries of flow information by data size, occurrences, or the like.

At the end of each defined time period, the data processing node generates a message consisting of aggregated local network flow information corresponding to the data processing node. In addition, the data processing node generates a list of random target destination data processing nodes to receive the message using a hash function and then sends the message to the target nodes. In parallel, the data processing node analyzes the global network flow information to determine whether there are network flow surges to one or more other data processing nodes connected to the network in a short period of time. The data processing node may further analyze a network flow history corresponding to the one or more other data processing nodes to determine whether the network flow surges are normal or not. If not, then the data processing node may determine that a DDoS attack is occurring.

Figure 3:
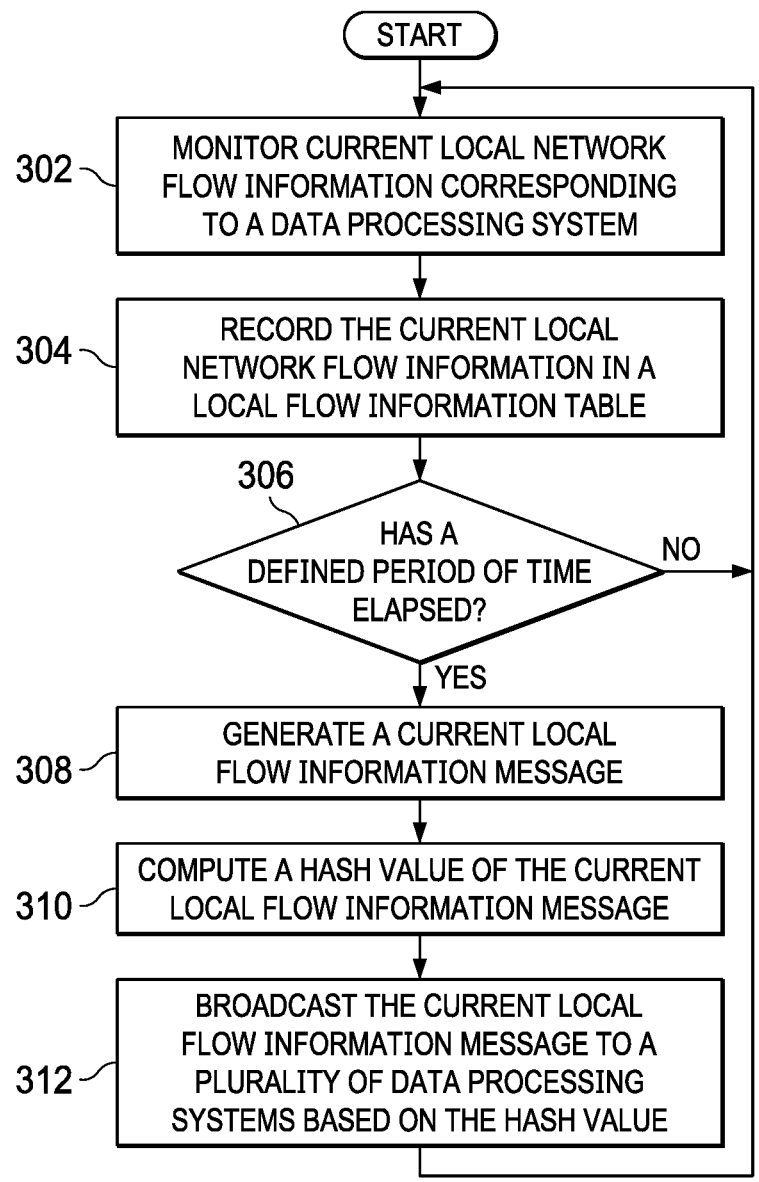
FIG. 3 is a flowchart illustrating a process for broadcasting current local network flow information to a plurality of randomly selected data processing systems connected to a network in accordance with an illustrative embodiment.

With reference now to FIG. 3, a flowchart illustrating a process for broadcasting current local network flow information to a plurality of randomly selected data processing systems connected to a network is shown in accordance with an illustrative embodiment. The process shown in FIG. 3 may be implemented in a data processing system, such as, for example, server 104 or client 110 in FIG. 1 or data processing system 200 in FIG. 2.

The process begins when the data processing system monitors current local network flow information corresponding to data packets received by the data processing system via a network (step 302). The current local network flow information may be, for example, current local network flow information 246 in FIG. 2. The data processing system may utilize a network flow information monitor, such as network flow information monitor 220 in FIG. 2, to monitor and analyze the current local network flow information. The network may be, for example, network 102 in FIG. 1. The data processing system also records the current local network flow information in a local flow information table, such as local flow information table 228 in FIG. 2 (step 304).

Subsequently, the data processing system makes a determination as to whether a defined period of time has elapsed (step 306). The defined period of time may be, for example, defined time period 226 in FIG. 2. If the data processing system determines that the defined period of time has not elapsed, no output of step 306, then the process returns to step 302 where the data processing system continues to monitor and record the current local network flow information. If the data processing system determines that the defined period of time has elapsed, no output of step 306, then the data processing system generates a current local network flow information message based on the current local network flow information recorded in the local flow information table for the defined period of time (step 308). The current local network flow information message may be, for example, current local flow information message 230 in FIG. 2.

In addition, the data processing system computes a hash value of the current local network flow information message using a hash function, such as hash function 222 in FIG. 2 (step 310). The hash value of the current local network flow information message may be, for example, hash value 232 in FIG. 2. Further, the data processing system broadcasts the current local network flow information message to a plurality of randomly selected data processing systems connected to the network based on the hash value of the current local network flow information message (step 312). The data processing system also may, for example, send the computed hash value with the current local network flow information message in order for the plurality of randomly selected data processing systems to validate the incoming message. Thereafter, the process returns to step 302 where the computer monitors current local network flow information for the next defined time period.

Figure 4:
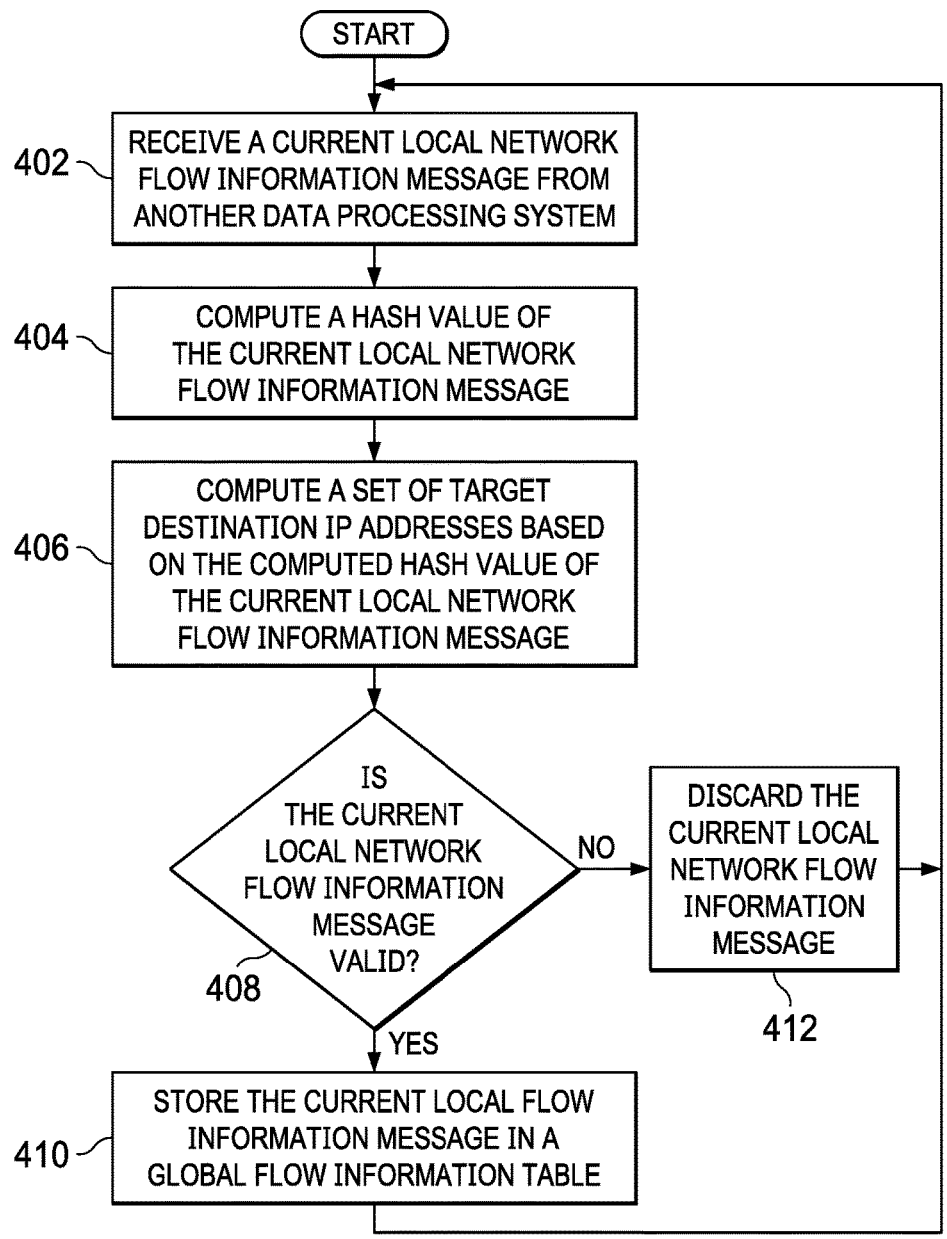
FIG. 4 is a flowchart illustrating a process for determining whether received network flow information is valid in accordance with an illustrative embodiment.

With reference now to FIG. 4, a flowchart illustrating a process for determining whether received network flow information is valid is shown in accordance with an illustrative embodiment. The process shown in FIG. 4 may be implemented in a data processing system, such as, for example, server 104 or client 110 in FIG. 1 or data processing system 200 in FIG. 2.

The process begins when the data processing system receives a current local network flow information message from another data processing system via a network (step 402). The current local network flow information message received from the other data processing system may be, for example, a message in current local network flow information messages 254 in FIG. 2. The other data processing system may be, for example, client 112 and the network may be, for example, network 102 in FIG. 1.

Afterward, the data processing system computes a hash value of the received current local network flow information message using a hash function, such as hash function 222 in FIG. 2 (step 404). The hash value of the received current local network flow information message may be, for example, a hash value in hash values 238 in FIG. 2. In addition, the data processing system computes a set of target destination IP addresses based on the hash value, such as hash value 232 in FIG. 2, of the received current local network flow information message (step 406). It should be noted that illustrative embodiments utilize step 406 to detect and prevent a data poisoning attack from a malicious network node, which is trying to compromise the detection process on attacked network nodes by providing false network flow information to the attacked network nodes.

Subsequently, the data processing system makes a determination as to whether the received current local network flow information message is valid based on the data processing system finding its IP address in the set of target destination IP addresses (step 408). If the data processing system determines that the received current local network flow information message is valid based on the data processing system finding its IP address in the set of target destination IP addresses, yes output of step 408, then the data processing system stores the current local network flow information message received from the other data processing system in a global flow information table, such as global flow information table 236 in FIG. 2 (step 410). If the data processing system determines that the received current local network flow information message is invalid based on the data processing system not finding its IP address in the set of target destination IP addresses, no output of step 408, then the data processing system discards the received current local network flow information message determined to be invalid (step 412). Thereafter, the process returns to step 402 where the computer continues to receive current local network flow information messages from one or more other data processing systems connected to the network.

Figure 5:
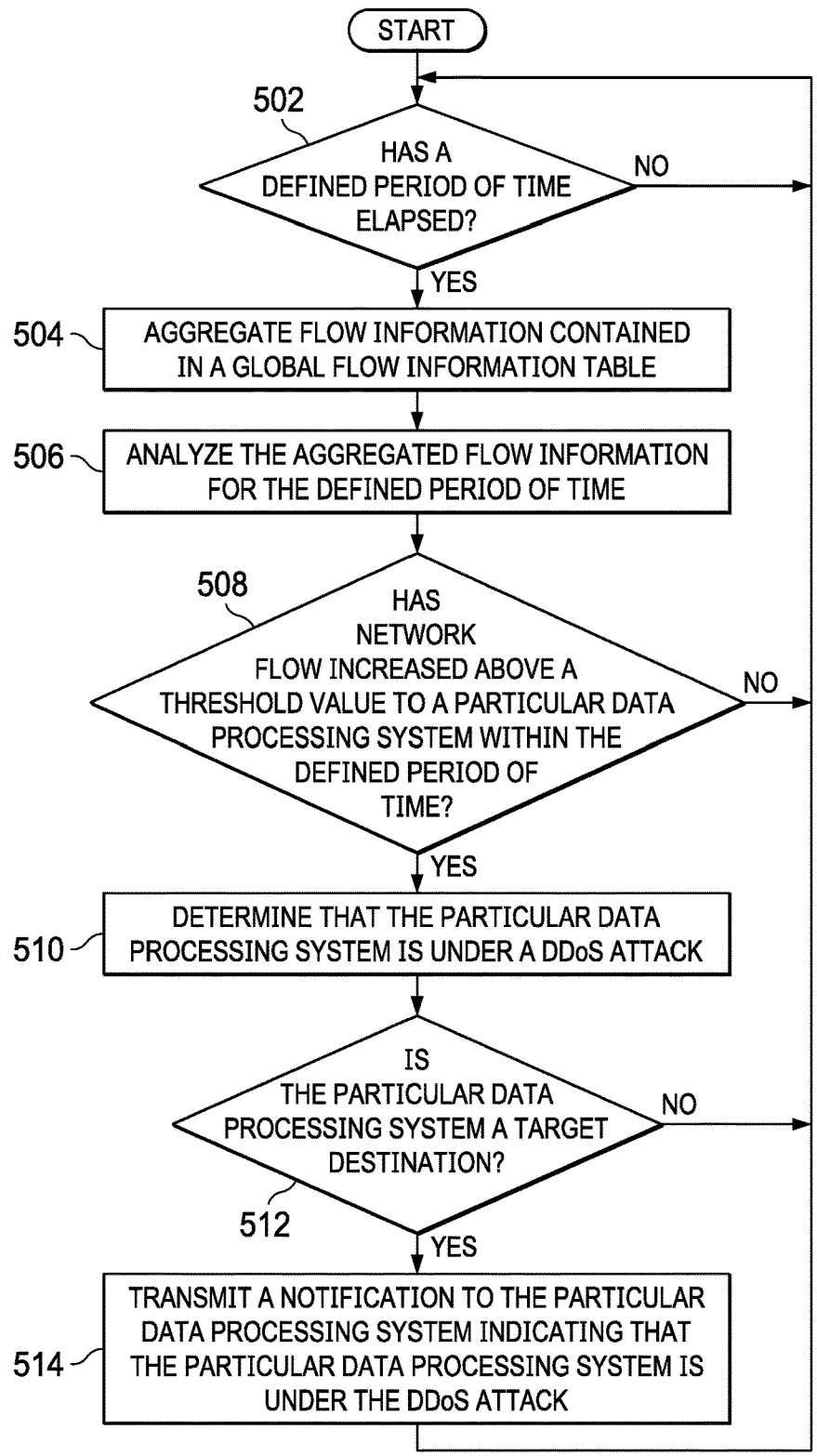
FIG. 5 is a flowchart illustrating a process for detecting that a data processing system is under a distributed denial-of-service attack in accordance with an illustrative embodiment.

With reference now to FIG. 5, a flowchart illustrating a process for detecting that a data processing system is under a DDoS attack is shown in accordance with an illustrative embodiment. The process shown in FIG. 5 may be implemented in a data processing system, such as, for example, server 104 or client 110 in FIG. 1 or data processing system 200 in FIG. 2.

The process begins when the data processing system makes a determination as to whether a defined period of time has elapsed (step 502). The defined period of time may be, for example, defined time period 226 in FIG. 2. If the data processing system determines that the defined period of time has not elapsed, no output of step 502, then the process returns to step 502 where the data processing system continues to wait for the defined period of time to elapse. If the data processing system determines that the defined period of time has elapsed, yes output of step 502, then the data processing system aggregates flow information contained in current local network flow information messages received from other data processing systems connected to a network stored in a global flow information table (step 504). The current local network flow information messages stored in the global flow information table may be, for example, current local network flow information messages 254 stored in the global flow information table 236 in FIG. 2. The other data processing systems connected to the network may be, for example, client 112 and client 114 connected to network 102 in FIG. 1.

Afterward, the data processing system analyzes the aggregated flow information, such as aggregated flow information 240 in FIG. 2, for the defined period of time (step 506). Subsequent to analyzing the aggregated flow information for the defined period of time in step 506, the data processing system makes a determination as to whether network flow increased above a defined flow threshold value to a particular data processing system connected to the network within the defined period of time (step 508). The defined flow threshold value may be, for example, defined flow threshold value 242 in FIG. 2.

If the data processing system determines that the network flow has not increased above the defined flow threshold value to a particular data processing system connected to the network within the defined period of time, no output of step 508, then the process returns to step 502 where the data processing system waits for the next defined period of time to elapse. If the data processing system determines that the network flow has increased above the defined flow threshold value to a particular data processing system connected to the network within the defined period of time, yes output of step 508, then the data processing system determines that the particular data processing system is under a DDoS attack (step 510). Further, the data processing system makes a determination as to whether that particular data processing system is a target destination for the data processing system based on current flow information recorded in a local flow information table (step 512). The current flow information recorded in the local flow information table may be, for example, current local flow information 246 recorded in local flow information table 228 in FIG. 2.

If the data processing system determines that the particular data processing system is not a target destination for the data processing system based on the current flow information recorded in the local flow information table, no output of step 512, then the process returns to step 502 where the data processing system waits for the next defined period of time to elapse. If the data processing system determines that that particular data processing system is a target destination for the data processing system based on the current flow information recorded in the local flow information table, yes output of step 512, then the data processing system transmits a notification to that particular data processing system indicating that that particular data processing system is under a DDoS attack (step 514). Thereafter, the process returns to step 502 where the data processing system waits for the next defined period of time to elapse.

Thus, illustrative embodiments of the present invention provide a computer-implemented method, data processing system, and computer program product for detecting DDoS attacks within a network based on data processing systems connected to the network sharing network flow information with other randomly selected data processing systems. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data processing system for detecting distributed denial-of-service (DDoS) attacks, the data processing system comprising:
   a bus system;
   a storage device connected to the bus system, wherein the storage device stores program instructions; and
   a processor connected to the bus system, wherein the processor executes the program instructions to:
   monitor, by a first data processing system, current local network flow information corresponding to data packets received by the first data processing system via the network;
   record, by the first data processing system, the current local network flow information in a local flow information table;
   generate, by the first data processing system, a current local network flow information message containing the current local network flow information;
   compute, by the first data processing system, a hash value of the current local network flow information message;
   broadcast, by the first data processing system, the current local network flow information message to a plurality of randomly selected data processing systems connected to the network based on the hash value of the current local network flow information message, wherein each data processing system has a corresponding node, and each node shares their respective local flow information with other data processing nodes randomly;
   analyze current aggregated flow information for a defined period of time, wherein the current aggregated flow information is a real-time current snapshot of an amount of network data packets flowing to the second data processing system from a plurality of different data processing systems via the network for the defined period of time, and the defined period of time represents a predetermined time interval threshold for when the first data processing system (i) transmits the current local network flow information recorded in the local flow information table to randomly selected other data processing systems connected to the network, and (ii) aggregates current local network flow information messages received from the other data processing systems;

determine whether network flow increased above a defined flow threshold value to a second data processing system connected to a network within the defined period of time based on analyzing the current aggregated flow information;

determine that the second data processing system is under a DDoS attack in response to determining that the network flow has increased above the defined flow threshold value to the second data processing system connected to the network within the defined period of time and transmit a notification to the second data processing system indicating that the second data processing system is under a DDoS attack;

determine, by the first data processing system, whether the network flow increased above the defined flow threshold value to the first data processing system, itself, within the defined period of time based on the analyzing of the current aggregated flow information; and responsive to the first data processing system determining that the network flow has increased above the defined flow threshold value to the first data processing system, itself, within the defined period of time, determine, by the first data processing system, that the first data processing system is under the DDoS attack and perform, by the first data processing system, mitigation steps to halt the DDoS attack on the first data processing system.

2. The data processing system of claim 1 further comprising:

responsive to the first data processing system receiving a current local network flow information message from the second data processing system, generating a hash value for the current local network flow information message received from the second data processing system and comparing the hash value generated for the current local network flow information message with an originally generated hash value sent with the current local network flow information message by the second data processing system in order to validate the current local network flow information message received from the second data processing system.

3. The data processing system of claim 1 further comprising:

determining, by the first data processing system, whether the defined period of time has elapsed; and responsive to the first data processing system determining that the defined period of time has elapsed, generating, by the first data processing system, a current local network flow information message based on the current local network flow information recorded in the local flow information table for the defined period of time.

4. A computer program product for detecting distributed denial-of-service (DDoS) attacks, the computer program product comprising a non-transitory computer readable storage medium having program instructions embodied therewith, the program instructions executable by a first data processing system to cause the first data processing system to perform a method comprising:

monitoring, by the first data processing system, current local network flow information corresponding to data packets received by the first data processing system via the network;

recording, by the first data processing system, the current local network flow information in a local flow information table;

generating, by the first data processing system, a current local network flow information message containing the current local network flow information;

computing, by the first data processing system, a hash value of the current local network flow information message;

broadcasting, by the first data processing system, the current local network flow information message to a plurality of randomly selected data processing systems connected to the network based on the hash value of the current local network flow information message, wherein each data processing system has a corresponding node, and each node shares their respective local flow information with other data processing nodes randomly;

analyzing, by the first data processing system, current aggregated flow information for a defined period of time, wherein the current aggregated flow information is a real-time current snapshot of an amount of network data packets flowing to the second data processing system from a plurality of different data processing systems via the network for the defined period of time, and the defined period of time represents a predetermined time interval threshold for when the first data processing system (i) transmits the current local network flow information recorded in the local flow information table to randomly selected other data processing systems connected to the network, and (ii) aggregates current local network flow information messages received from the other data processing systems;

determining, by the first data processing system, whether network flow increased above a defined flow threshold value to a second data processing system connected to a network within the defined period of time based on the analyzing of the current aggregated flow information;

responsive to the first data processing system determining that the network flow has increased above the defined flow threshold value to the second data processing system connected to the network within the defined period of time, determining, by the first data processing system, that the second data processing system is under a DDoS attack and transmitting a notification to the second data processing system indicating that the second data processing system is under a DDoS attack;

determining, by the first data processing system, whether the network flow increased above the defined flow threshold value to the first data processing system, itself, within the defined period of time based on the analyzing of the current aggregated flow information; and responsive to the first data processing system determining that the network flow has increased above the defined flow threshold value to the first data processing system, itself, within the defined period of time, determining, by the first data processing system, that the first data processing system is under the DDoS attack and performing, by the first data processing system, mitigation steps to halt the DDoS attack on the first data processing system.

5. The computer program product of claim 4 further comprising:
determining, by the first data processing system, whether the defined period of time has elapsed; and
responsive to the first data processing system determining that the defined period of time has elapsed, aggregating, by the first data processing system, flow information contained in network flow information messages received from other data processing systems connected to the network and stored in a global flow information table.

6. The computer program product of claim 4 further comprising:
determining, by the first data processing system, whether the second data processing system is a target destination for the first data processing system based on current flow information recorded in a local flow information table; and
responsive to the first data processing system determining that the second data processing system is the target destination for the first data processing system based on the current flow information recorded in the local flow information table, transmitting, by the first data processing system, the notification to the second data processing system indicating that the second data processing system is under the DDoS attack.

7. The computer program product of claim 4 further comprising:
receiving, by the first data processing system, a current local network flow information message from another data processing system via the network;
computing, by the first data processing system, a hash value of the current local network flow information message; and
computing, by the first data processing system, a set of target destination IP addresses based on the hash value of the current local network flow information message.

8. The computer program product of claim 4 further comprising:
responsive to the first data processing system receiving a current local network flow information message from the second data processing system, generating a hash value for the current local network flow information message received from the second data processing system and comparing the hash value generated for the current local network flow information message with an originally generated hash value sent with the current local network flow information message by the second data processing system in order to validate the current local network flow information message received from the second data processing system.

9. The computer program product of claim 4 further comprising:
determining, by the first data processing system, whether the defined period of time has elapsed; and
responsive to the first data processing system determining that the defined period of time has elapsed, generating, by the first data processing system, a current local network flow information message based on the current local network flow information recorded in the local flow information table for the defined period of time.

10. A computer program product for detecting distributed denial-of-service (DDoS) attacks, the computer program product comprising a non-transitory computer readable storage medium having program instructions embodied therewith, the program instructions executable by a first data processing system to cause the first data processing system to perform a method comprising:
analyzing, by the first data processing system, current aggregated flow information for a defined period of time;
determining, by the first data processing system, whether network flow increased above a defined flow threshold value to a second data processing system connected to a network within the defined period of time based on the analyzing of the current aggregated flow information;
responsive to the first data processing system determining that the network flow has increased above the defined flow threshold value to the second data processing system connected to the network within the defined period of time, determining, by the first data processing system, that the second data processing system is under a DDoS attack and transmitting a notification to the second data processing system indicating that the second data processing system is under a DDoS attack;
receiving, by the first data processing system, a current local network flow information message from another data processing system via the network;
computing, by the first data processing system, a hash value of the current local network flow information message;
computing, by the first data processing system, a set of target destination IP addresses based on the hash value of the current local network flow information message;
determining, by the first data processing system, whether the current local network flow information message is valid based on the first data processing system finding its IP address in the set of target destination IP addresses;
responsive to the first data processing system determining that the current local network flow information message is valid based on the first data processing system finding its IP address in the set of target destination IP addresses, storing, by the first data processing system, the current local network flow information message received from the other data processing system in a global flow information table; and
responsive to the first data processing system determining that the current local network flow information message is invalid based on the first data processing system not finding its IP address in the set of target destination IP addresses, discarding, by the first data processing system, the current local network flow information message.

* * * * *